US012773860B2

(12) United States Patent
Hsu et al.

(10) Patent No.: US 12,773,860 B2
(45) Date of Patent: Oct. 27, 2026

(54) PRINTING DEVICE

(71) Applicant: PRIMAX ELECTRONICS LTD., Taipei City (TW)

(72) Inventors: Wei-Hsun Hsu, Taipei City (TW); Wen-Lung Hung, Taipei City (TW); Wei-Ping Zeng, Taipei City (TW)

(73) Assignee: PRIMAX ELECTRONICS LTD., Taipei City (TW)

( * ) Notice: Subject to any disclaimer, the term of this patent is extended or adjusted under 35 U.S.C. 154(b) by 125 days.

(21) Appl. No.: 18/735,215

(22) Filed: Jun. 6, 2024

(65) Prior Publication Data

US 2025/0340070 A1 Nov. 6, 2025

(30) Foreign Application Priority Data

May 6, 2024 (CN) ......................... 202410551293.6

(51) Int. Cl.

*B41J 11/00* (2006.01)
*B41J 3/407* (2006.01)
*B41J 2/32* (2006.01)
*B41J 3/50* (2006.01)

(52) U.S. Cl.

CPC ............. *B41J 11/005* (2013.01); *B41J 3/407* (2013.01); *B41J 11/006* (2013.01); *B41J 2/32* (2013.01); *B41J 3/4075* (2013.01); *B41J 3/50* (2013.01); *B41J 11/0095* (2013.01)

(58) Field of Classification Search

CPC ........ B41J 11/005; B41J 3/407; B41J 11/006; B41J 2/32; B41J 3/4075; B41J 3/50; B41J 11/0095; B41J 11/04; B41J 11/0055; B41J 15/04; B41J 15/046

See application file for complete search history.

(56) References Cited

U.S. PATENT DOCUMENTS

2014/0225972 A1* 8/2014 Kanda .................... B41J 15/042 347/215

FOREIGN PATENT DOCUMENTS

WO WO-2025028504 A1 * 2/2025 ................ B41J 2/32

* cited by examiner

*Primary Examiner* — Justin Seo
(74) *Attorney, Agent, or Firm* — WPAT, PC

(57) ABSTRACT

A printing device includes a print head mechanism and a platen roller. The print head mechanism includes a mounting bracket, a print head module and a guide member. When the print head module prints a pattern on the print medium, the print medium is pressed by the platen roller, the platen roller is rotated in a first rotating direction, and the print medium is moved from the print head module to the guide member. When a detecting process is performed, the platen roller is rotated in a second rotating direction, and the print medium is contacted with the guide member and moved toward the platen roller. After a rear end of the print medium is contacted with the platen roller, the print medium is moved along a circumferential direction of the platen roller and transferred through a region under the print head module and a detection region.

4 Claims, 10 Drawing Sheets

PRINTING DEVICE

FIELD OF THE INVENTION

The present invention relates to a printing device, and more particularly to a printing device for printing radio frequency (radio frequency identification (RFID) tags.

BACKGROUND OF THE INVENTION

A radio frequency identification (RFID) technology is a communication technology for identifying RFID tags, also known as electronic tags. In accordance with the principles of the RFID technology, wireless frequencies (e.g., electromagnetic induction, microwaves, etc.) are utilized to identify objects and transmit data and read relevant information without the need of machinery or optical contact. This technology has been used in aircraft identification as early as World War II. Until 2003, the global retail leader Wal-Mart required the top 100 suppliers to install RFID tags on boxes and pallets, and the RFID technology began to attract attention under the leadership of the U.S. Department of Defense.

The difference between the RFID tag and the ordinary tag is that the RFID tag has an electronic chip inside. Consequently, the RFID tag is thicker and harder than the ordinary tag. Furthermore, during the process of printing the RFID tag, the printed and written RFID tag needs to be recycled along the original printing path. In addition, the data needs to be confirmed because it is necessary to further confirm the reading and writing accuracy of the data in the chip.

FIG. 1 schematically illustrates the structure of a conventional printing device. During the recycling process of the conventional printing device P, some problems occur. As shown in FIG. 1, a platen roller B3 is rotated in a second rotating direction RD2 (e.g., a counterclockwise direction) during the recycling process. However, the rear end of the RFID tag PA possibly gets stuck in the print head module 12. Under this circumstance, a paper jam problem or a label peeling problem occurs.

Therefore, it is important to provide an improved printing device in order to overcome the drawbacks of the conventional technologies.

SUMMARY OF THE INVENTION

An object of the present invention provides an improved printing device.

The other objects and advantages of the present invention will be understood from the disclosed technical features.

In accordance with an aspect of the present invention, a printing device is provided. The printing device includes a print head mechanism and a platen roller. The print head mechanism includes a mounting bracket, a print head module and a guide member. The mounting bracket is fixed on the printing device. The print head module is fixed on the mounting bracket. The print head module prints a pattern on a print medium. The guide member is fixed on the mounting bracket. The platen roller is fixed on the printing device. When the print head module prints the pattern on the print medium, the print medium is pressed by the platen roller. When the printing device performs a printing operation, the platen roller is rotated in a first rotating direction, and the print medium is moved from the print head module to the guide member. Consequently, the pattern is printed on the print medium by the print head module. When the printing device performs a detecting process, the platen roller is rotated in a second rotating direction, and the print medium is contacted with a bottom side of the guide member and moved toward the platen roller. After a rear end of the print medium is contacted with the platen roller, the print medium is moved along a circumferential direction of the platen roller and transferred through a region under the print head module, and the print medium is transferred to a detection region. The first rotating direction and the second rotating direction are opposite to each other.

In an embodiment, the mounting bracket further includes a top plate and two side plates, and the top plate has a top surface and a bottom surface. The top surface and the bottom surface are opposed to each other with respect to the top plate. The two side plates are respectively extended from two opposite sides of the top plate in a direction away from the bottom surface of the top plate. The two side plates face each other.

In an embodiment, there is a vertical distance between the top surface of the top plate and a bottom side of the guide member.

In an embodiment, the vertical distance is in a range between 6.8 mm and 7.0 mm.

In an embodiment, the top plate has at least one first mounting hole, and the first mounting hole has an elliptical shape.

In an embodiment, the print head module is fixedly disposed on the bottom surface of the top plate, and the print head module includes a heat-dissipation block, a circuit board and a heating module.

In an embodiment, the heat-dissipation block has a top surface and a bottom surface, and the top surface and the bottom surface are opposed to each other. In addition, at least one second mounting hole is formed in the top surface of the heat-dissipation block and aligned with the at least one first mounting hole, and the at least one second mounting hole has a circular shape.

In an embodiment, the circuit board is fixed on the bottom surface of the heat-dissipation block, the heating module is installed on the circuit board, and the heating module includes a heating line and at least one heating element.

In an embodiment, each of the two side plates includes at least one first positioning structure.

In an embodiment, two ends of the guide member includes two second positioning structures, respectively. The guide member is fixed on the mounting bracket through the second positioning structures and the corresponding first positioning structures.

In an embodiment, the guide member includes a metal rod or a plastic strip.

In an embodiment, the printing device further includes a top cover and a base member. The print heat mechanism is detachably fixed on the top cover. The platen roller is rotatably fixed on the base member.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
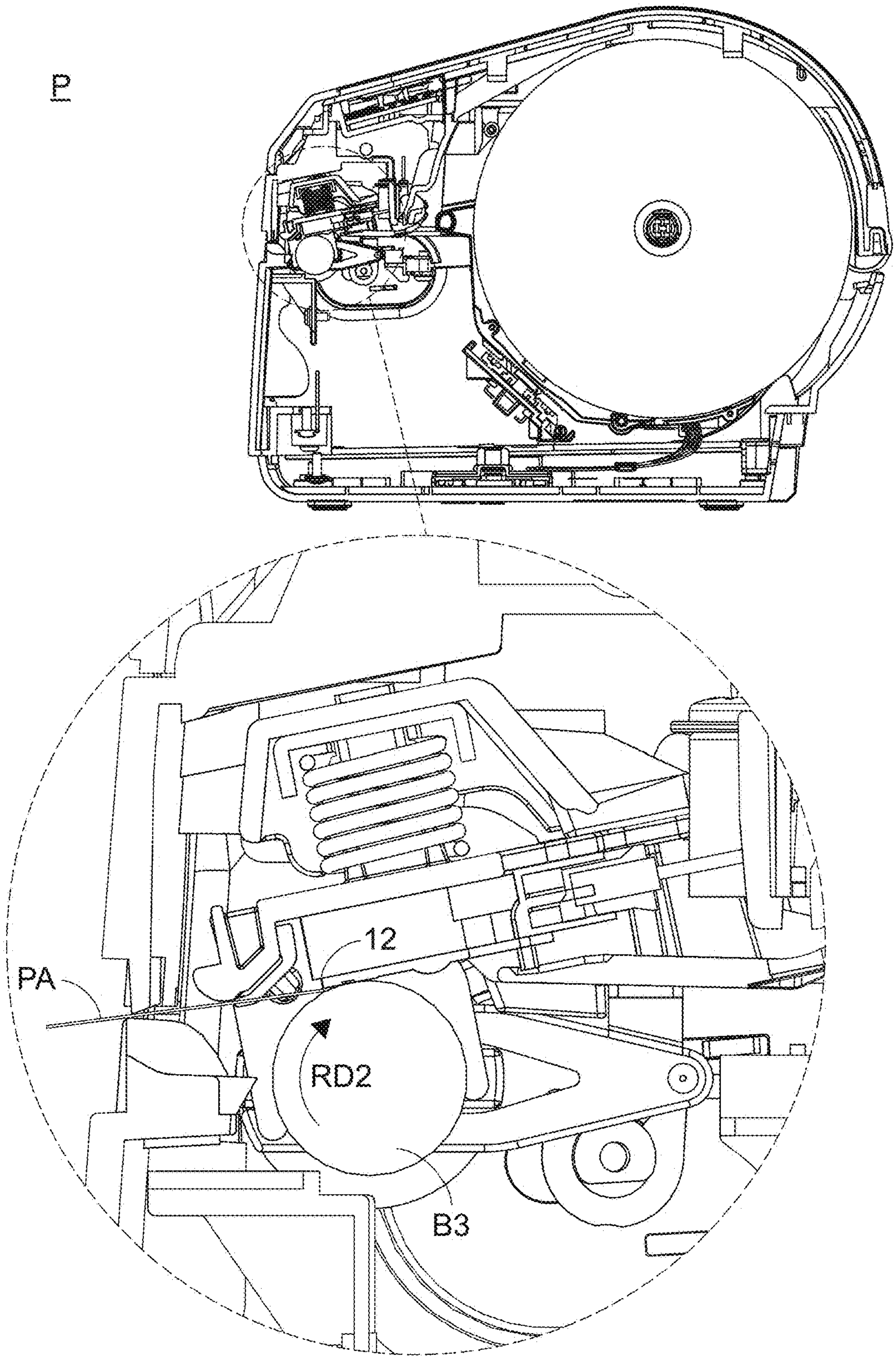
FIG.1 PRIOR ART
FIG. 1 schematically illustrates the structure of a conventional printing device.
Figure 2:
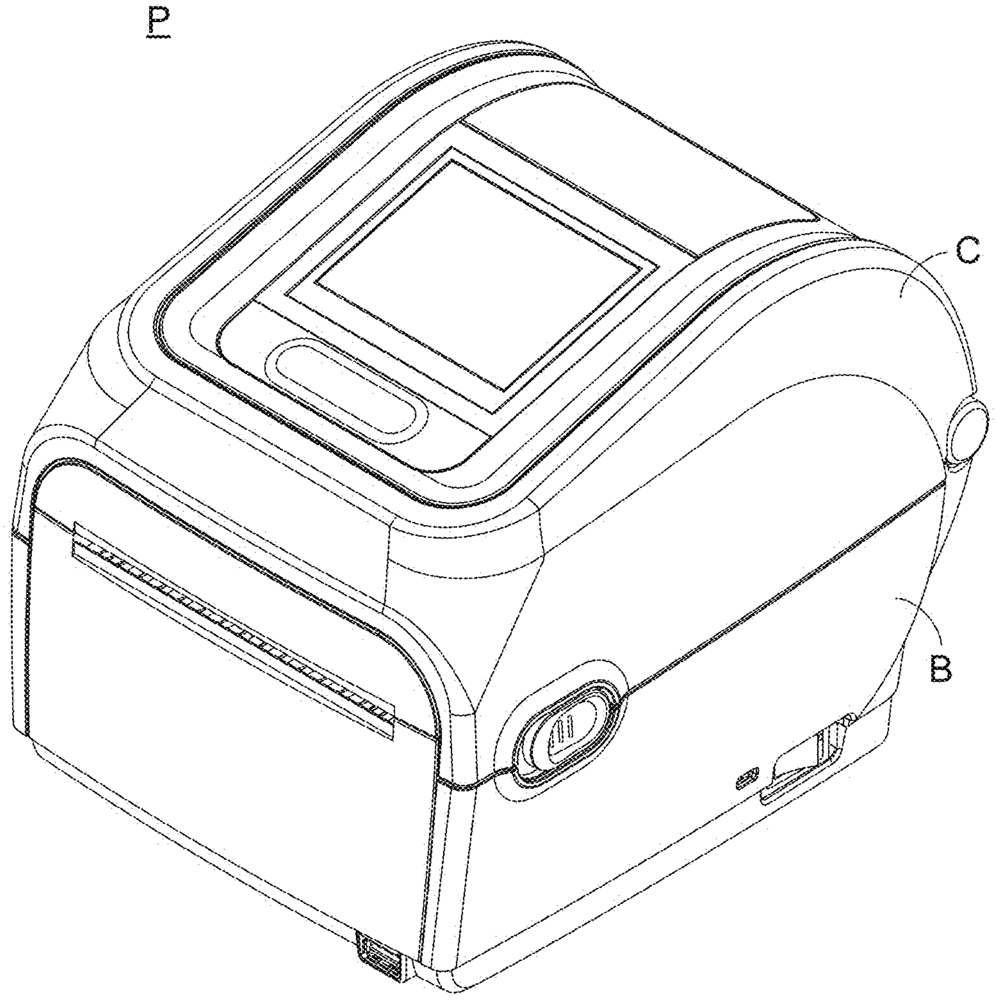
FIG. 2 is a schematic perspective view illustrating a printing device P according to a first embodiment of the present invention.
Figure 3:
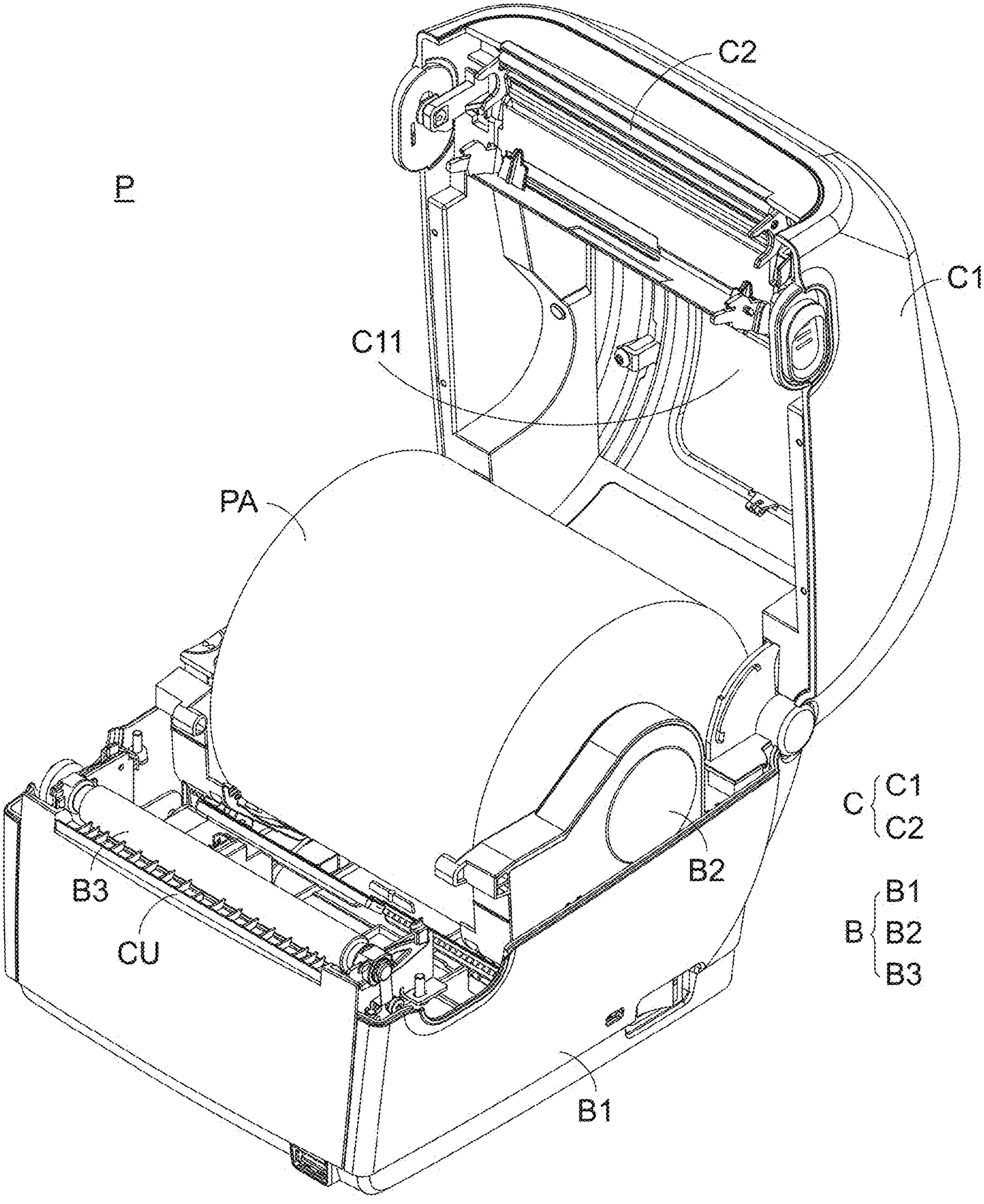
FIG. 3 is a schematic perspective view illustrating the printing device P shown in FIG. 2, in which a top cover of the printing device is opened.
Figure 4A:
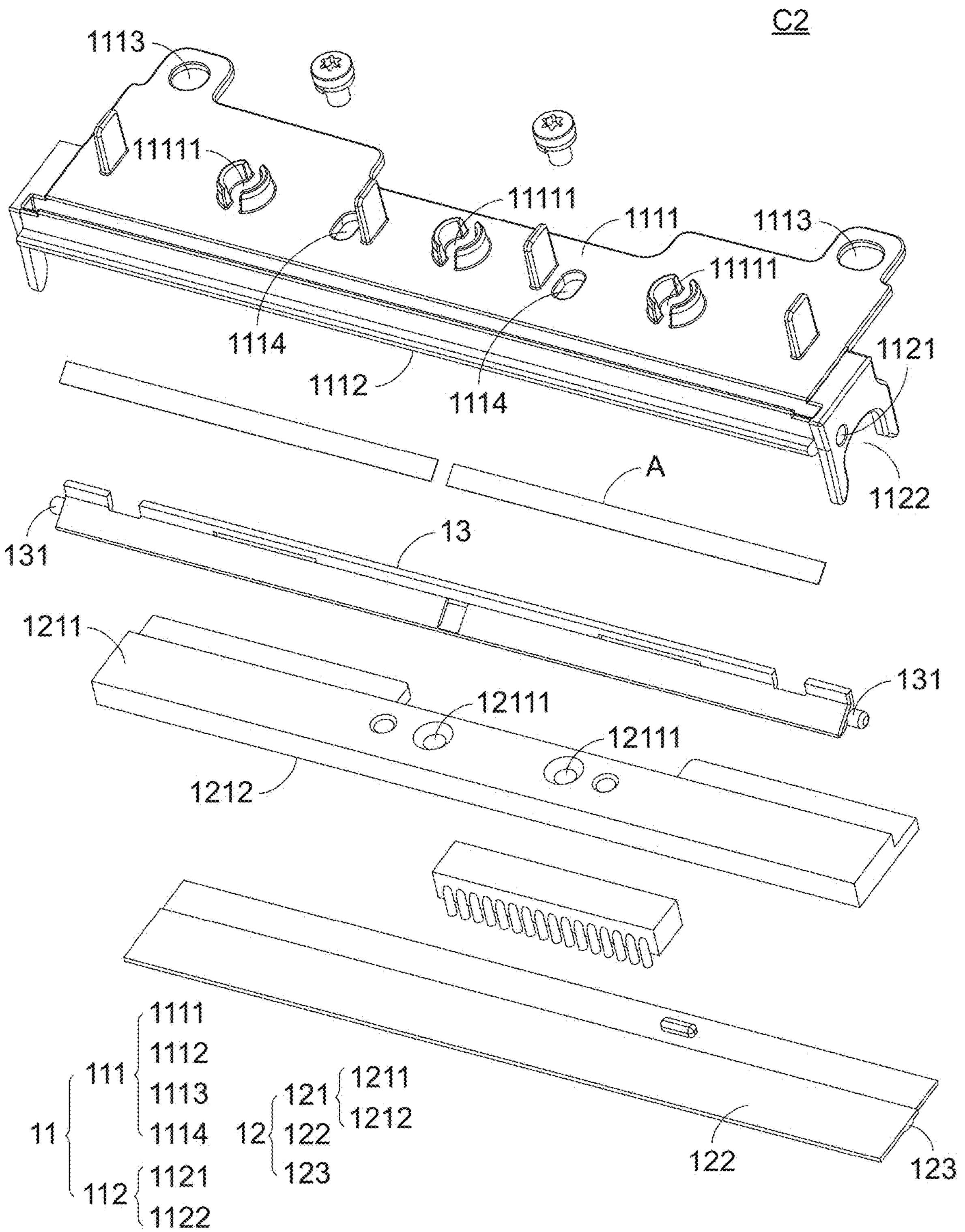
FIGS. 4A and 4B are schematic exploded views illustrating a print head mechanism of the printing device according to the first embodiment of the present invention and taken along different viewpoints.
Figure 4B:
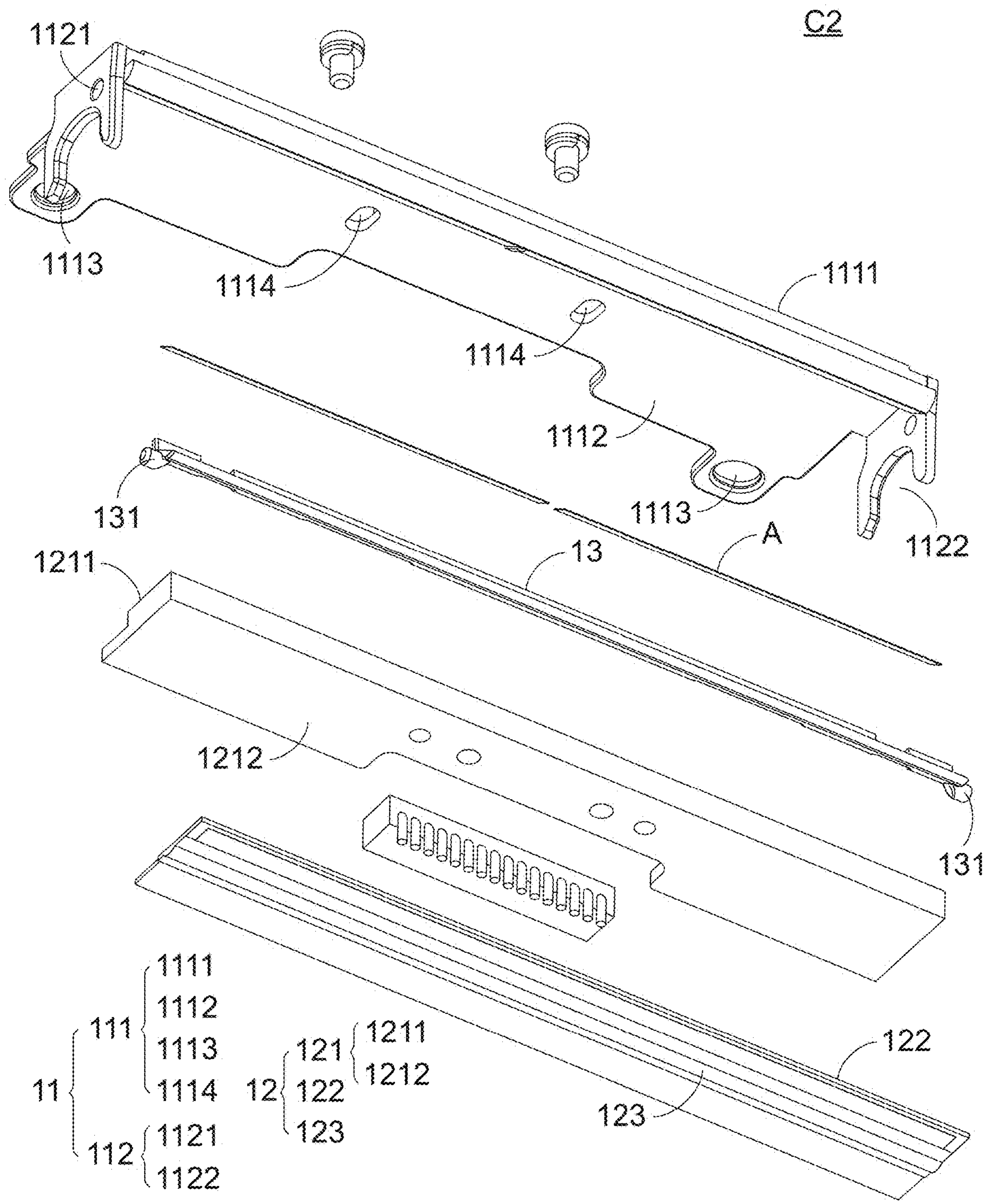
Figure 5:
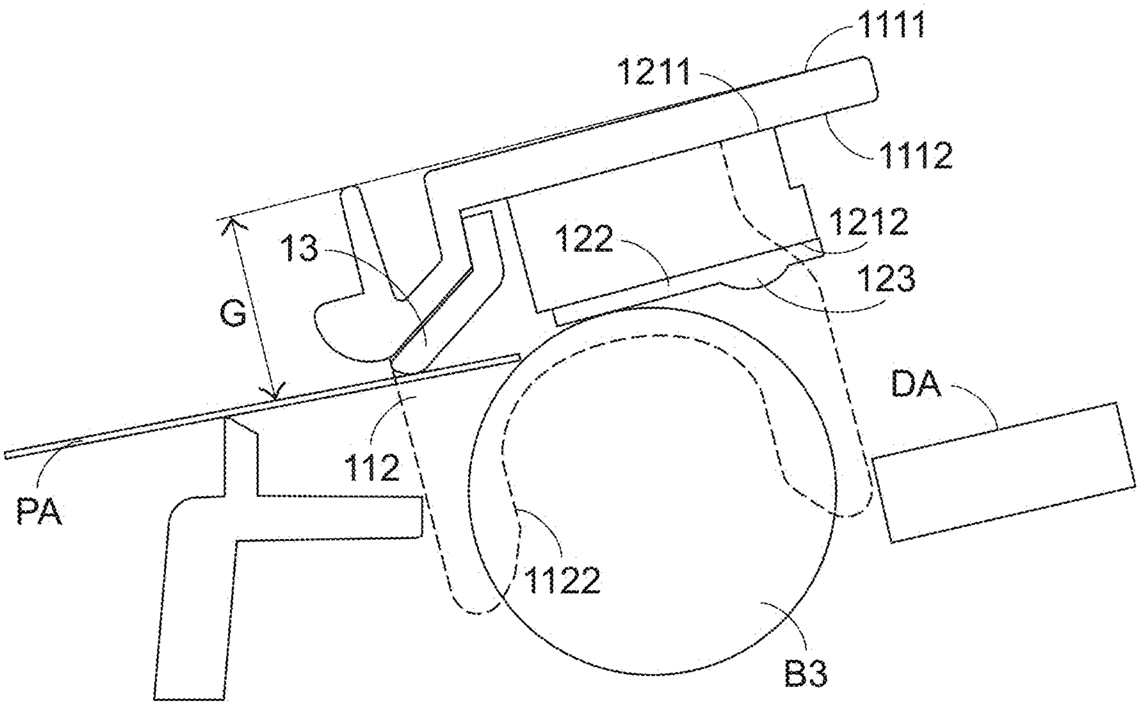
FIG. 5 is a schematic cross-sectional view illustrating the relationship between the print head mechanism and a platen roller of the printing device P according to the first embodiment of the present invention.

FIG. 2 is a schematic perspective view illustrating a printing device P according to a first embodiment of the present invention. FIG. 3 is a schematic perspective view illustrating the printing device P according to the first embodiment of the present invention, in which a top cover C of the printing device P is opened. FIGS. 4A and 4B are schematic exploded views illustrating a print head mechanism C2 of the printing device P according to the first embodiment of the present invention and taken along different viewpoints. FIG. 5 is a schematic cross-sectional view illustrating the relationship between the print head mechanism C2 and a platen roller B3 of the printing device P according to the first embodiment of the present invention. FIGS. 6A to 6D are schematic cross-sectional views illustrating the simplified operations of the print head mechanism C2 and a platen roller B3 of the printing device P according to the first embodiment of the present invention. FIGS. 7A and 7B are schematic exploded views illustrating a print head mechanism C2' of a printing device P according to a second embodiment of the present invention and taken along different viewpoints.

Please refer to FIGS. 2 and 3. The printing device P of the present invention includes a top cover C and a base member B. The top cover C and the base member B are connected with each other. Preferably but not exclusively, the top cover C and the base member B are connected with each other in a pivotally coupling manner or a detachable engaging manner.

The base member B includes a base body B1, a paper roll holder B2 and a platen roller B3. The paper roll holder B2 is located at the rear end of the base body B1. The platen roller B3 is rotatably mounted at the front end of the base body B1. A print medium PA is installed on the paper roll holder B2. Preferably but not exclusively, the print medium PA is a radio frequency identification (RFID) tag paper roll. When the printing device P prints a pattern I on the print medium PA (see FIG. 5), the platen roller B3 is used to press the print medium PA.

Please refer to FIG. 3. The top cover C comprises a top cover body C1 and a print head mechanism C2. The print head mechanism C2 is detachably fixed on the front end of the top cover body C1. That is, the print head mechanism C2 is approximately located over the platen roller B3. The rear end of the top cover body C1 is provided with an accommodation space C11. The print medium PA is accommodated within the accommodation space C11.

In an embodiment, the base member B further includes a tearing knife structure CU. The tearing knife structure CU is located at the front end of the base body B1. That is, the tearing knife structure CU is located in front of the platen roller B3. After the print medium PA has been printed, the tearing knife structure CU is used to allow the user to tear off the print medium PA. It is noted that the installation location of the tearing knife structure CU is not restricted. For example, in another embodiment, the tearing knife structure CU is disposed on the top cover body C1 according to space requirements.

Please refer to FIGS. 4A, 4B and 5. In an embodiment, the print head mechanism C2 includes a mounting bracket 11, a print head module 12 and a guide member 13. The appearance of the mounting bracket 11 is generally in the shape of a long strip. The mounting bracket 11 includes a top plate 111 and two side plates 112. The top plate 111 includes a top surface 1111, a bottom surface 1112, at least one fixing hole 1113 and at least one first mounting hole 1114.

The top surface 1111 and the bottom surface 1112 are opposed to each other. Moreover, at least one position-limiting structure 11111 is disposed on the top surface 1111 of the top plate 111. The at least one position-limiting structure 11111 are upwardly and vertically protruded from the top surface 1111 and bottom surface 1112. Due to the position-limiting structure 11111, a corresponding elastic element (not shown) is allowed to be moved in the upward and downward directions only. In an embodiment, the at least one position-limiting structure 11111 includes three position-limiting structures 11111. The three position-limiting structures 11111 are discretely disposed on the top surface 1111 of the top plate 111. It is noted that the number of the at least one position-limiting structure 11111 is not restricted. The bottom surface 1112 of the top plate 111 is connected with the print head module 12.

The at least one fixing hole 1113 is formed in an extension part of a long side of the top plate 111. The print head mechanism C2 is fixed on the top cover C of the printing device P through the at least one fixing hole 1113. In an embodiment, the at least one fixing hole 1113 includes two fixing holes 1113. It is noted that the number of the at least one fixing hole 1113 is not restricted. The at least one first mounting hole 1114 runs through the top plate 111. The print head module 12 is fixed on the mounting bracket 11 through the at least one first mounting hole 1114. In an embodiment, the at least one first mounting hole 1114 includes two first mounting holes 1114. It is noted that the number of the at least one first mounting hole 1114 is not restricted. Preferably but not exclusively, the shape of the first mounting hole 1114 is elliptical.

In the mounting bracket 11, the two side plates 112 are respectively extended from two short sides of the top plate 111 in a direction away from the bottom surface 1112. The two side plates 112 face each other. Each of the two side plates 112 includes at least one first positioning structure 1121 and an arc-shaped structure 1122. The guide member 13 is positioned on the mounting bracket 11 through the at least one positioning structure 1121. Preferably but not exclusively, the first positioning structure 1121 is a positioning hole. The arc-shaped structure 1122 is located at a side of the corresponding side plate 112 away from the top plate 111. The mounting bracket 11 is contacted with and supported on the two ends of the platen roller B3 through the two arc-shaped structures 1122, respectively. Consequently, during the printing process of the printing device P, the mounting bracket 11 is more stable and not rocked. Due to this structural design, the printing density of the pattern I is uniform, and the printing quality is improved.

Please refer to FIGS. 4A, 4B and 5 again. The print head module 12 is fixed near the rear end of the mounting bracket 11. In an embodiment, the print head module 12 includes a heat-dissipation block 121, a circuit board 122 and a heating module 123. The heat-dissipation block 121 has a top surface 1211 and a bottom surface 1212. The top surface 1211 and the bottom surface 1212 are opposed to each other. Moreover, at least one second mounting hole 12111 is formed in the top surface 1211 of the heat-dissipation block 121. The heat-dissipation block 121 is fixed on the mounting bracket 11 through the at least one second mounting hole 12111. The number and the position of the at least one second mounting hole 12111 match the number and the position of the at least one first mounting hole 1114. In an embodiment, the second mounting hole 12111 is a screw hole. In an embodiment, the at least one second mounting hole 12111 includes two second mounting holes 12111. It is noted that the number of the at least one second mounting hole 12111 is not restricted. Preferably but not exclusively, the shape of the second mounting hole 12111 is circular. Preferably but not exclusively, the first mounting hole 1114 and the corresponding second mounting hole 12111 are fixedly connected with each other in a screw locking manner. In a variant example, the at least one second mounting hole 12111 runs through the top surface 1211 and the bottom surface 1212 of the heat-dissipation block 121.

As mentioned above, the at least one first mounting hole 1114 has the elliptical shape, and the at least one second mounting hole 12111 has a circular shape. Due to these structural designs, the position of the heat-dissipation block 121 can be adjusted according to the thickness of the print medium PA when the heat-dissipation block 121 is installed on the mounting bracket 11.

The circuit board 122 is installed on the bottom surface 1212 of the heat-dissipation block 121. The heating module 123 is fixed on the circuit board 122. In an embodiment, the heating module 123 includes a heating line and a group of heating elements. The heating line is composed of plural heating points. For example, in an embodiment, the heating line is composed of 864 heating points. The group of heating elements are respectively used to be controlled to increase the temperature of specified heating points. Consequently, a carbon ribbon (not shown) will be transferred to the print medium PA. During the operation of the heating module 123, a large amount of heat energy is generated. The arrangement of the heat-dissipation block 121 can assist the heating module 123 in heat dissipation. In an embodiment, the number of the heating elements is six. It is noted that the number of the heating elements is not restricted.

Please refer to FIGS. 4A, 4B and 5 again. The guide member 13 is located near the front end of the mounting bracket 11. That is, the guide member 13 is located near the print head module 12. While the printing device P performs a detecting process, the guide member 13 is used to adjust the recovery angle of the print medium PA. In an embodiment, the appearance of the guide member 13 is approximately in the shape of a long strip. The guide member 13 includes at least two second positioning structures 131. The two second positioning structures 131 are respectively located at the two ends of the guide member 13 in the longitudinal direction. The guide member 13 is positioned and fixed on the mounting bracket 11 through the cooperation of the at least two second positioning structures 131 and the corresponding first positioning structures 1121 of the two side plates 112 of the mounting bracket 11. In other words, the number of the at least two second positioning structures 131 matches the number of the at least one first positioning structure 1121 of the two side plates 112.

In an embodiment, the guide member 13 is adhered to the bottom surface 1112 of the top plate 111 through at least one adhesive layer A. Preferably but not exclusively, the guide member 13 is made of plastic material. The use of the plastic material as the guide member 13 is advantageous because the plastic material has low thermal conductivity. Consequently, in the continuous printing condition, the influence of the temperature of the print head module 12 on the guide member 13 is largely reduced. Since the printing quality is not affected, the problem of generating non-uniform color of the pattern I will be minimized.

Figure 6A:
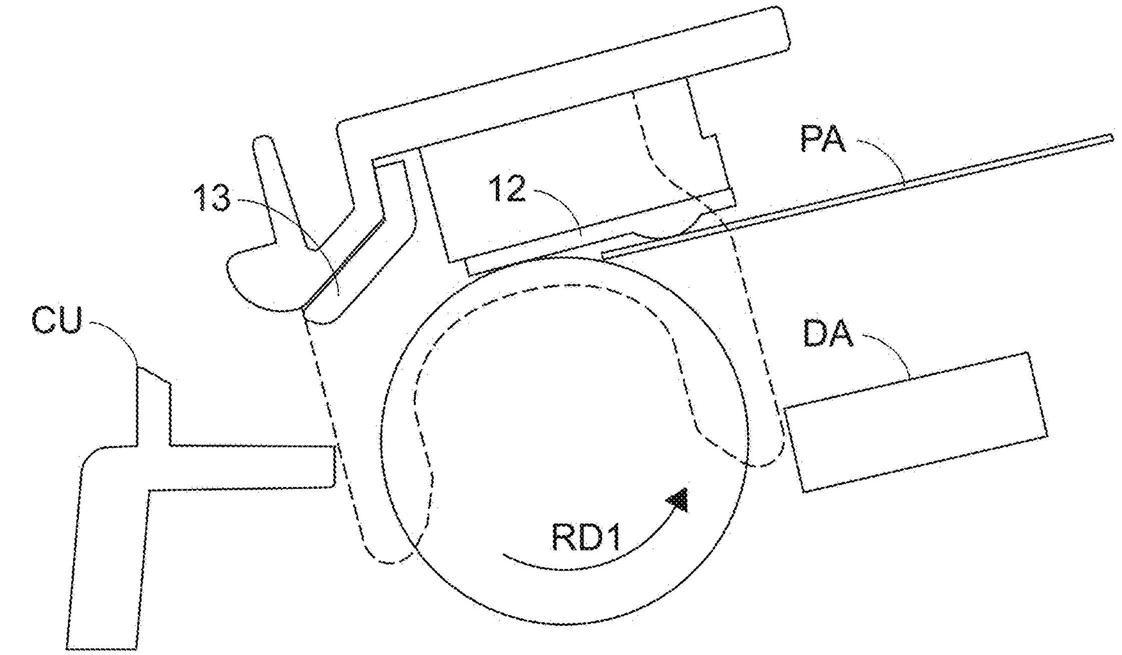
FIGS. 6A to 6D are schematic cross-sectional views illustrating the simplified operations of the print head mechanism and a platen roller of the printing device according to the first embodiment of the present invention.
Figure 6B:
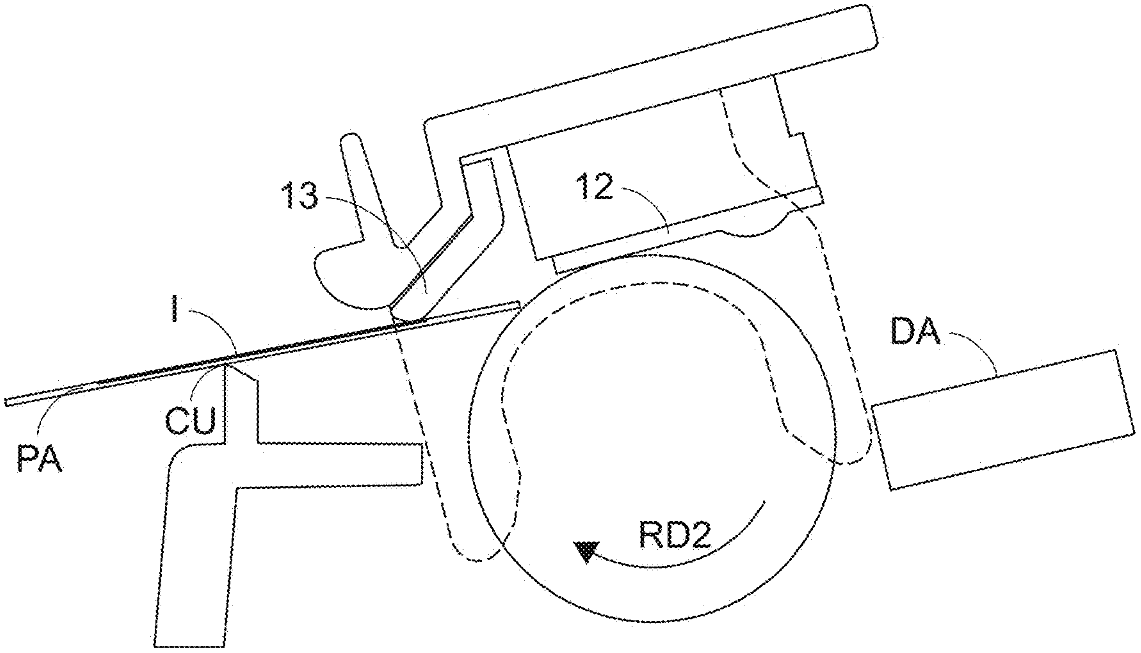

Please refer to FIGS. 6A to 6D. FIGS. 6A and 6B schematically illustrate the simplified operations of printing the pattern I on the print medium PA by the printing device P. When the printing device P performs the printing operation, the platen roller B3 is driven to rotate in a first rotating direction RD1, and the print medium PA is moved from the rear end to the front end of the printing device P. When the print medium PA is moved to the position under the print head module 12, the pattern I is printed on the print medium PA by the print head module 12. Then, the print medium PA with the printed pattern I will be moved from the print head module 12 in the direction toward the guide member 13. At the same time, the bottom surface of the print medium PA near the front end is contacted with the tearing knife structure CU.

Figure 6C:
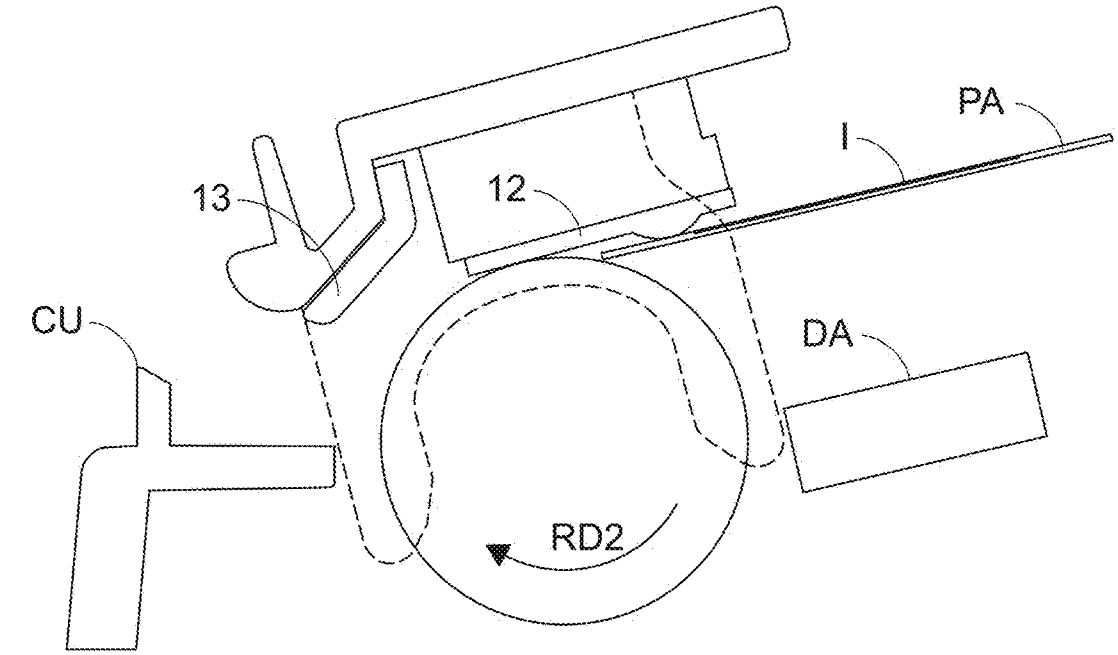
Figure 7A:
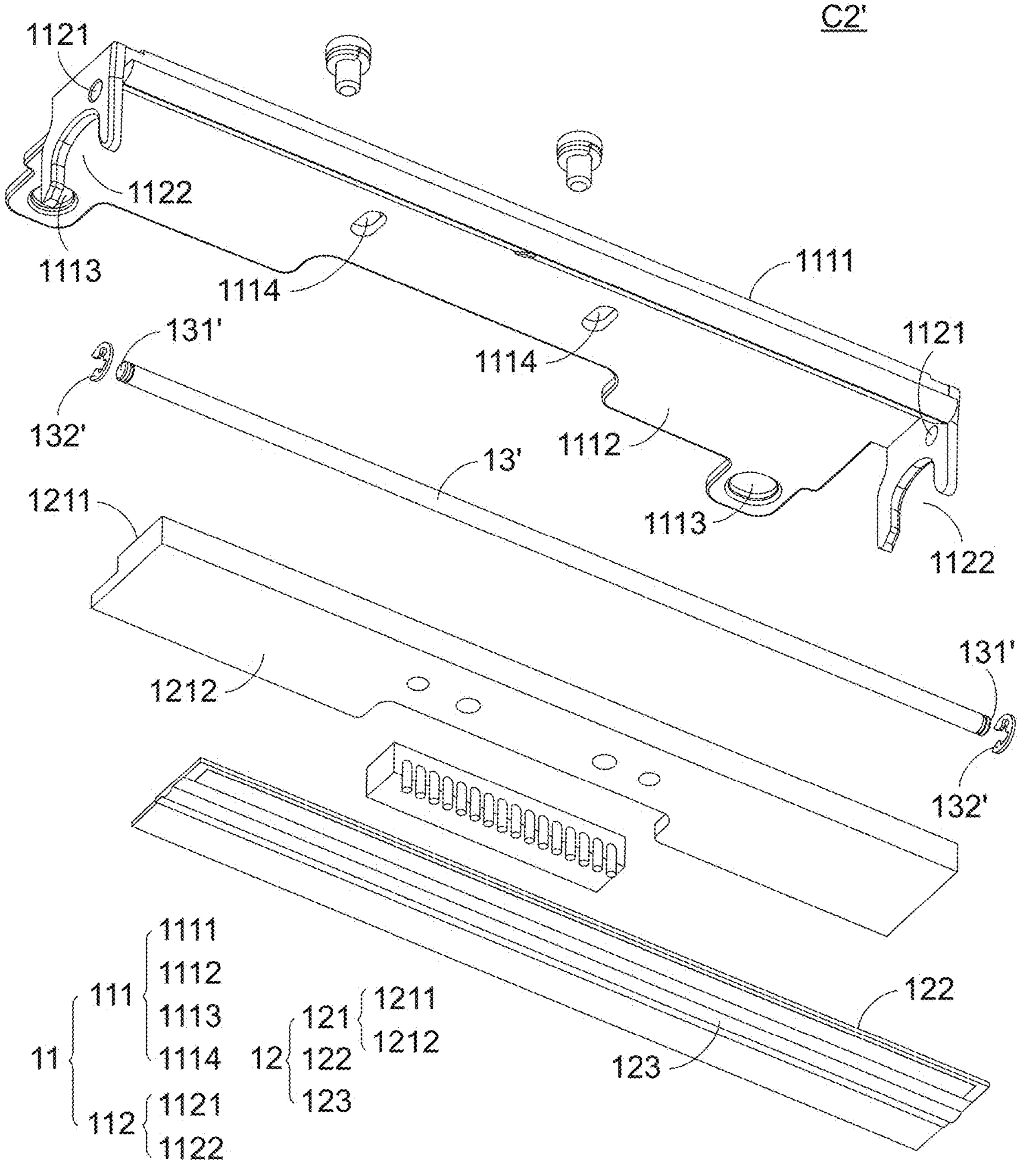
FIGS. 7A and 7B are schematic exploded views illustrating a print head mechanism of a printing device according to a second embodiment of the present invention and taken along different viewpoints.
Figure 7B:
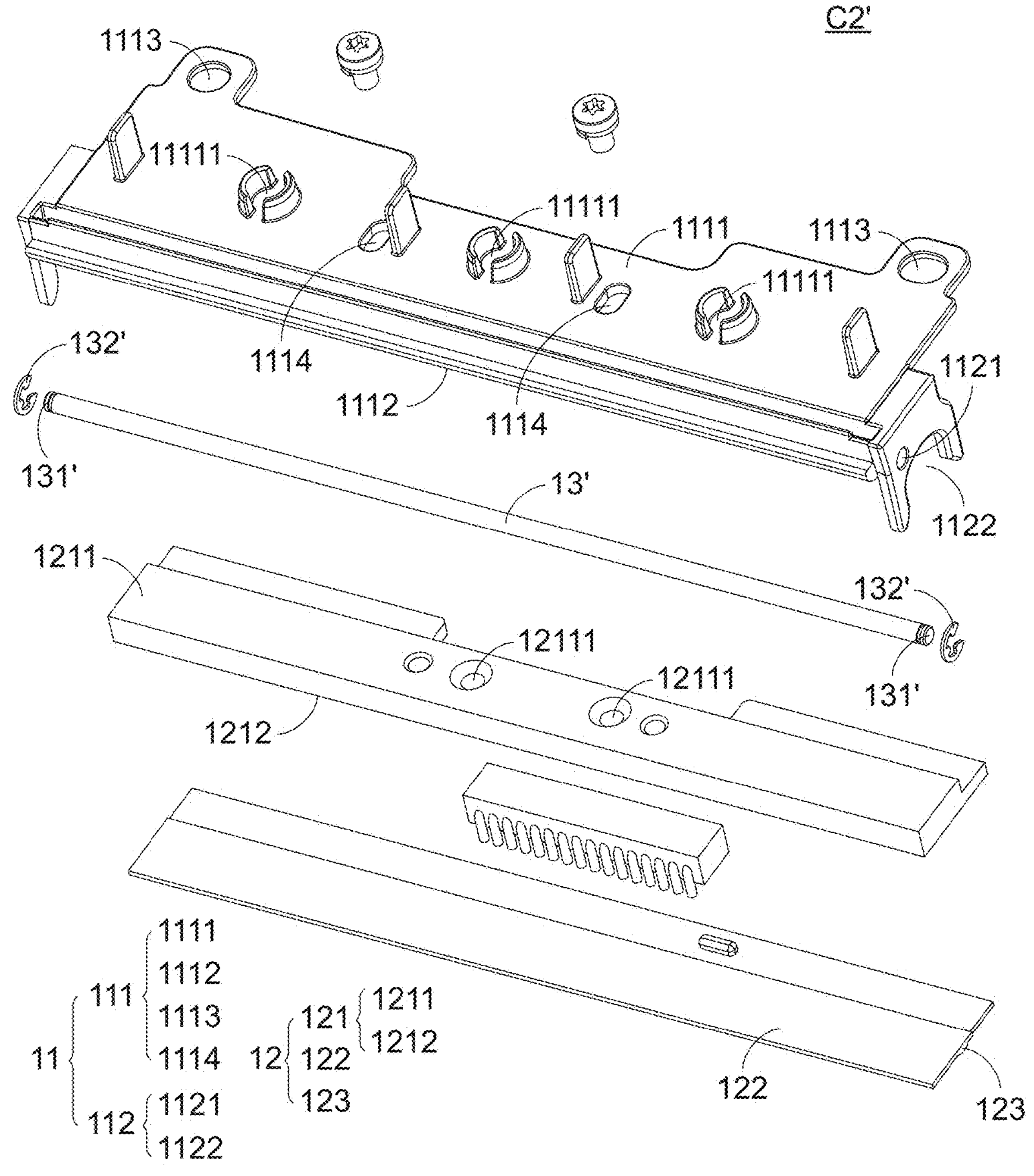

Please refer to FIG. 6C. After the pattern I is printed on the print medium PA by the printing device P, the printing device P needs to perform a detecting process. Meanwhile, the platen roller B3 is driven to rotate in a second rotating direction RD2. The print medium PA with the printed pattern I is contacted with the bottom side of the guide member 13 and moved toward the platen roller B3. That is, the print medium PA is moved from the front end to the rear end of the printing device P. The rear end of the print medium PA with the printed pattern I will be firstly contacted with the platen roller B3. Then, the print medium PA is moved along the circumferential direction of the platen roller B3 and transferred through the region under the print head module 12. Then, the print medium PA is transferred to a detection region DA for detection. The first rotating direction RD1 and the second rotating direction RD2 are opposite to each other.

Furthermore, as shown in FIG. 5, there is a vertical distance G between the bottom side of the guide member 13 (i.e., the region contacted with the print medium PA) and the top surface 1111 of the top plate 111. Preferably but not exclusively, the vertical distance G is in the range between 6.8 mm and 7.0 mm.

Figure 6D:
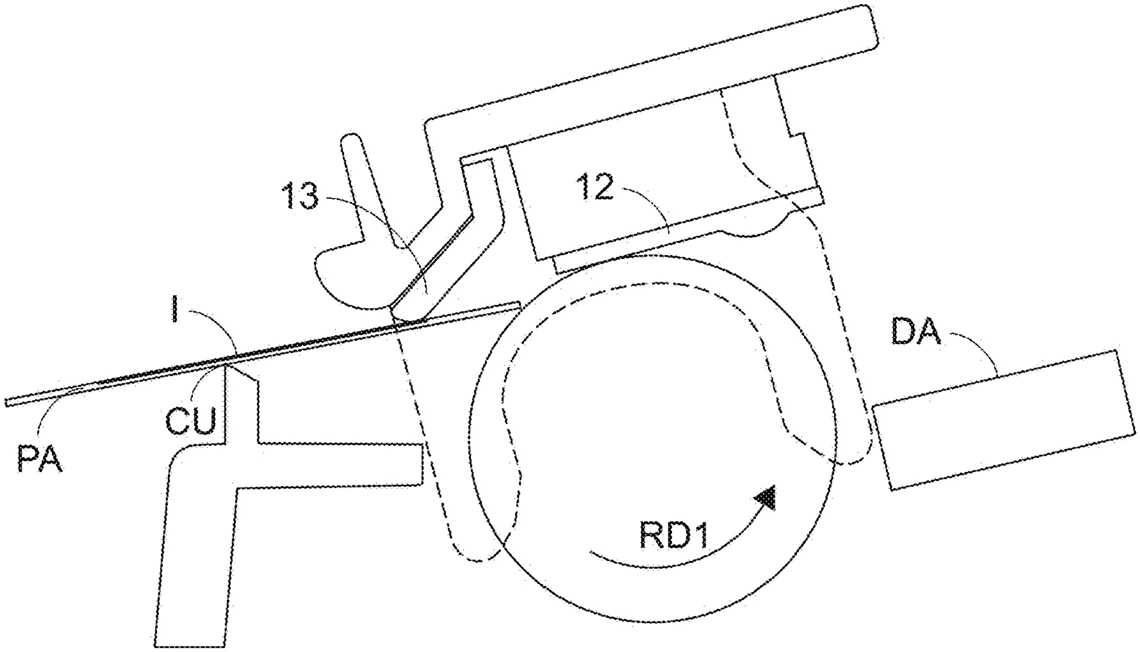

Please refer to FIG. 6D. After the detecting process on the print mediumPA with the printed pattern I is completed, the platen roller B3 is driven to rotate again in the first rotating direction RD1, and the print medium PA is moved from the rear end to the front end of the printing device P. The print medium PA is moved from the detection region DA in the direction toward the region under the print head mechanism C2. After the print medium PA is transferred through the region under the print head mechanism C2, the print medium PA is moved to the tearing knife structure CU. Meanwhile, the user can use the tearing knife structure CU to cut off the print medium PA with the printed pattern.

FIGS. 7A and 7B are schematic exploded views illustrating a print head mechanism C2' of a printing device P according to a second embodiment of the present invention and taken along different viewpoints. Except for the structure of the guide member 13', the other components of the print head mechanism C2' in this embodiment are similar to those of print head mechanism in the above embodiment. Component parts and elements corresponding to those of the first embodiment are designated by identical numeral references, and detailed descriptions thereof are omitted.

In this embodiment, the guide member 13' is a rod. In addition, the guide member 13' is made of metallic material. That is, the guide member 13' is a metal rod. The guide member 13 includes two second positioning structures 131'. The two second positioning structures 131' are respectively located at the two ends of the guide member 13'. The two second positioning structures 131' are respectively penetrated through the corresponding first positioning structures 1121 of the two side plates 112 of the mounting bracket 11. The guide member 13' is rotatable relative to the two side plates 112. In this embodiment, the two ends of the guide member 13' are rotatably fixed to the first positioning structures 1121 of the two side plates 112 through corresponding stopping elements 132'. Consequently, during the rotation of the guide member 13', the two second positioning structures 131' will not be detached from the two first positioning structures 1121.

From the above descriptions, the printing device P of the present invention at least has the following benefits:

Firstly, the print head mechanism in the printing device of the present invention is provided with a guide member near the front end, i.e., the paper exit position. During the process of recovering and rechecking the print medium, the recovery angle of the print medium can be adjusted. Consequently, the rear end of the print medium is firstly contacted with the platen roller, and then the print medium is moved along the circumferential direction of the platen roller and transferred through the region under the print head module. In this way, the paper jam problem or the label peeling problem at the front end of the print head module can be effectively prevented.

Secondly, the arrangement of the guide member in the printing device of the present invention can support the condition of printing the print medium with the thickness of 0.25 mm.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A printing device, comprising:

a print head mechanism comprising a mounting bracket, a print head module and a guide member, wherein the mounting bracket is fixed on the printing device, the print head module is fixed on the mounting bracket, the print head module prints a pattern on a print medium, and the guide member is fixed on the mounting bracket; and a platen roller fixed on the printing device, wherein when the print head module prints the pattern on the print medium, the print medium is pressed by the platen roller, wherein when the printing device performs a printing operation, the platen roller is rotated in a first rotating direction, and the print medium is moved from the print head module to the guide member, so that the pattern is printed on the print medium by the print head module, wherein when the printing device performs a detecting process, the platen roller is rotated in a second rotating direction, and the print medium is contacted with a bottom side of the guide member and moved toward the platen roller, wherein after a rear end of the print medium is contacted with the platen roller, the print medium is moved along a circumferential direction of the platen roller and transferred through a region under the print head module, and the print medium is transferred to a detection region, wherein the first rotating direction and the second rotating direction are opposite to each other, wherein the nipping point between the print head module and the platen roller defines an imaginary plane tangential to the surface of the platen roller, and the guide member protrudes through the plane from the print head module side of the plane towards the platen roller side of the plane.

2. The printing device according to claim 1, wherein the mounting bracket further comprises a top plate and two side plates, and the top plate has a top surface and a bottom surface, wherein the top surface and the bottom surface are opposed to each other, the two side plates are respectively extended from two opposite sides of the top plate in a direction away from the bottom surface of the top plate, and the two side plates face each other.

3. The printing device according to claim 2, wherein there is a vertical distance between the top surface of the top plate and a bottom side of the guide member.

4. The printing device according to claim 3, wherein the vertical distance is in a range between 6.8 mm and 7.0 mm.

* * * * *